United States Patent [19]

Morander

[11] Patent Number: 4,911,551
[45] Date of Patent: Mar. 27, 1990

[54] APPARATUS FOR DETERMINING THE REAL OR VIRTUAL DISTANCE OF A LIGHT SOURCE FROM A MEASUREMENT PLANE

[76] Inventor: Karl-Erik Morander, S. Rydsbergsvagen 21, 443 00 Lerum, Sweden

[21] Appl. No.: 240,764
[22] PCT Filed: Aug. 21, 1987
[86] PCT No.: PCT/EP87/00473
  § 371 Date: May 26, 1988
  § 102(e) Date: May 26, 1988
[87] PCT Pub. No.: WO88/02099
  PCT Pub. Date: Mar. 24, 1988

[30] Foreign Application Priority Data

Sep. 15, 1986 [DE] Fed. Rep. of Germany ....... 3631373

[51] Int. Cl.⁴ .................. G01B 11/24; G01C 3/10
[52] U.S. Cl. .......................... 356/376; 356/1; 356/375
[58] Field of Search ............. 356/1, 375, 376

[56] References Cited

U.S. PATENT DOCUMENTS 4,522,492 6/1985 Masunaga ................. 356/1
4,701,047 10/1987 Eibert et al. ............. 356/1

FOREIGN PATENT DOCUMENTS 0121617 10/1984 European Pat. Off. .
59-164910 1/1985 Japan .
8002455 11/1980 PCT Int'l Appl. .
2119504 11/1983 United Kingdom .

Primary Examiner—F. L. Evans
Attorney, Agent, or Firm—Wood, Dalton, Phillips, Mason & Rowe

[57] ABSTRACT

The measuring apparatus serves for measuring the distance of an object from a measurement surface. The apparatus contains an illumination unit, which is preferably a laser. Furthermore the apparatus contains an optical image reproduction system with which a light ray projected onto the object by the illumination unit is imaged, after reflection, on an optical sensor. A two-dimensional charge-coupled semiconductor sensor should be used as optical sensor, which sensor has a plurality of electrodes arranged in the form of a matrix. To evaluate the position of a light spot-point of concentration on the image region of the charge-coupled semiconductor sensor all pulse trains should be evaluated which can be retrieved from illuminated electrode series. In this way a high resolution is achieved despite a relatively small number of electrodes in any one series.

8 Claims, 5 Drawing Sheets

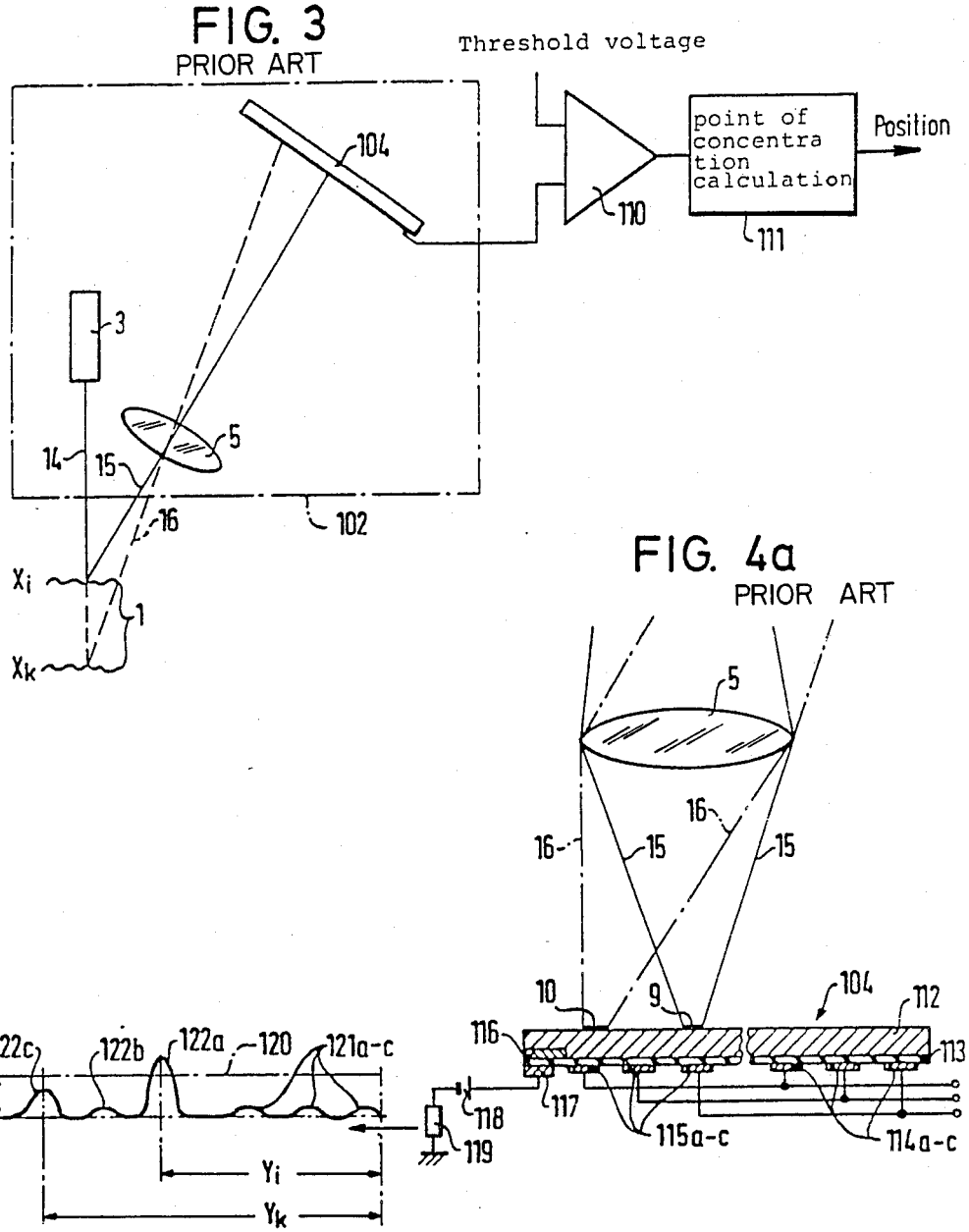

FIG. 7

Calculation of position of the light-spot of concentration $n=1$: $S_1 = (Y_6 + Y_4) = (6+4) = 10$ $D_2 = (Y_6 - Y_4 + 1) = (6-4+1) = 3$ $\frac{1}{2} S_n \cdot D_n = \frac{1}{2} \cdot 10 \cdot 3 \quad = 15$ $n=2$: $S_2 = (Y_6 + Y_3) = (6+3) = 9$ $D_2 = (Y_6 - Y_3 + 1) = (6-3+1) = 4$ $\frac{1}{2} S_2 \cdot D_2 = \frac{1}{2} \cdot 9 \cdot 4 \quad = 18$ $n=3$: $S_3 = (Y_6 + Y_3) = (6+3) = 9$ $D_3 = (Y_6 - Y_3 + 1) = (6-3+1) = 4$ $\frac{1}{2} S_3 \cdot D_3 = \frac{1}{2} \cdot 9 \cdot 4 \quad = 18$ $n=4$: $S_4 = (Y_6 + Y_4) = (6+4) = 10$ $D_4 = (Y_6 - Y_4 + 1) = (6-4+1) = 3$ $\frac{1}{2} S_4 \cdot D_4 = \frac{1}{2} \cdot 10 \cdot 3 \quad = 15$ $$Y_S = \frac{\sum \frac{1}{2} S_n \cdot D_n}{\sum D_n} = \frac{15 + 18 + 18 + 15}{3 + 4 + 4 + 3} = 4{,}71$$

$\boxed{Y_S = 4{,}71}$ und">APPARATUS FOR DETERMINING THE REAL OR VIRTUAL DISTANCE OF A LIGHT SOURCE FROM A MEASUREMENT PLANE

TECHNICAL FIELD OF THE INVENTION

The invention relates to an apparatus for determining the real or virtual distance of a light source from a measurement plane, with an optical image reproduction system, which images the light emanating from the light source as a light spot on the measurement plane, defined by a series of electrodes, of a charge-coupled semiconductor sensor, and with an evaluation circuit, by means of which, from the pulses of the pulse train which is retrievable from the charge-coupled semiconductor sensor, the position of the point of concentration of the light spot on the measurement plane and thus the distance to the light source is calculated by averaging.

BACKGROUND OF THE INVENTION

Apparatuses of the above kind are known. An apparatus with a linear analog sensor is described in European Patent Application No. 81 106 262 of the present applicant. This known apparatus is also represented in FIG. 1. The apparatus is denoted by 2 and contains an illumination unit 3, from which a light ray 14 emanates. This falls on an object of measurement 1. Reflected light ray 15 is projected onto the linear analog sensor 4 by an optical image reproduction system 5. If the distance of the object 1 increases from $X_0$ to $X_1$, then reflected ray 16 arrives on the linear analog sensor 4 through the optical image reproduction system 5. Each of the two reflected rays 15, 16 strikes the sensor 4 at a different point. Currents $i_1$ and $i_2$ produced by the sensor 4 are evaluated in an evaluation circuit 6 working in an analog manner for determining light spot position on the sensor 4. From this position the distance of the object 1 in relation to the apparatus 2 or the illumination unit 3 or the measurement plane of the sensor 4 can, in turn, be determined.

FIG. 2 shows the construction of the linear analog sensor 4 slightly more precisely. This consists of an elongated semiconductor chip 5 which is equipped with electrodes 6, 7 at both its ends. The measurement plane 8 extends between the electrodes 6,7. The electrodes are biassed relative to the semiconductor chip by a battery 13. The incident light rays 15 or 16 produce light spots 9 or 10 on the measurement plane 8. The light spot 9 is at distance (position) $y_i$ from the electrode 7. The light spot 10 is at distance (position) $y_k$ from the electrode 7. The currents $i_1$ and $i_2$ measured by current measuring apparatus 11, 12 depend on the position of the light spot on the measurement plane 8.

The linear analog sensor 4 shown in FIG. 2 has the advantage that it reacts to the slightest changes to the light spot on the measurement plane and because of this has a high resolution. On the other hand, it has the disadvantage that with incidence of spurious light it produces a false reading. If one imagines, for example, that the light spot 10 is created by an undesired reflected light ray, which also originates from the illumination unit 3, then the influence of the light spot 10 on the measuring result cannot be eliminated even if the light ray 14 emanating from the illumination unit 3 is modulated and demodulation is effected in the evaluation circuit 6 in FIG. 1. The linear analog sensor 4 reacts therefore to both light spots 9, 10 simultaneously, as it simply adds the minority carriers released by both light spots. The measuring result established in this way would lead to a falsely calculated position, which lies between $y_i$ and $y_k$.

In order to avoid the disadvantage outlined last, a linear charge-coupled semiconductor sensor is used, as shown in FIGS. 4a and 4b, in place of the linear analog sensor. Such a linear semiconductor sensor is described, for example, in DE-PS 22 59 008. It is also known as a CCD-sensor (charge-coupled-device). FIG. 4a shows the linear charge-coupled semiconductor sensor 104 in section, while FIG. 4b shows it from above. It consists of an elongated semiconductor chip 112, which is covered by an insulating layer 113. On the insulating layer 113 there are arranged electrode triplets 114a to c and 115a to c. The corresponding electrodes of these electrode triplets are connected to each other by supply leads. A semiconductor zone 116 provided at the end is of a charge type which is opposite to that of the semiconductor body, so that a pn junction is formed between zone 116 and the semiconductor body 112. Furthermore the semiconductor zone 116 is connected to an electrode 117. The electrode 117 is connected by way of a direct-current source 118 to a resistor 119 which is connected to ground. The direct-current source 118 is poled in such a way that the pn-junction is reverse biassed. Charge carriers are released by light impinging on the semiconductor body 112, which carriers assemble as charge carrier packets close to the electrodes. By means of pulsating dc voltage applied to the electrodes from right to left the charge carrier packets are transported further in the same direction, whereby pulses appear on the resistor 119. In FIG. 4b a charge carrier packet assembled over the electrode 115c due to light spot 9 is indicated by dark dots. A charge carrier packet assembled over the electrode 115a due to the light spot 10 is indicated by less dense dark dots. Since the light spot 9 is more intense than the light spot 10, the charge carrier packet which assembles over the electrode 115c is denser than that which assembles over the electrode 115a. Consequently the pulses 121a to c and 122a to c appearing on the resistor 119 over time are of differing heights. The highest pulse 122a corresponds to the charge carrier packet assembled over the electrode 115c. The second highest pulse 122c corresponds to the charge carrier packet assembled over the electrode 115a. From the temporal separation of the pulses from the beginning of the pulse train, the position $y_i$ of the light spot 9 or the position $y_k$ of the light spot 10 can be determined.

From the representation of the pulse train of FIG. 4a one can recognise that it is possible, by means of a threshold voltage discriminator with a threshold voltage 120, to distinguish between the different height pulses 122a and 122c. In other words, it is possible in this way to suppress the pulse 122c derived from the spurious light spot 10 whilst the pulse 122a derived from the useful light spot is taken alone for evaluation.

An appropriate circuit which is also known is shown in FIG. 3. The same features as in FIG. 1 are denoted here by the same reference numbers. The apparatus is denoted by 102 and the linear charge-coupled semiconductor sensor by 104. The output of the charge-coupled semiconductor sensor 104 is connected to a threshold voltage discriminator 110, the output product of which is led to a circuit 111 for calculating the point of concentration. Thereby, the position of the light spot on the measurement plane can be established.

As compared with the linear analog sensor, the linear charge-coupled semiconductor sensor not only has the advantage that it opens up the possibility of efficiently distinguishing between spurious and useful light, even when the spurious light originates from the same illumination unit as the useful light, but it also has the further advantage of being more sensitive than the linear analog sensor. In other words, this means that the linear charge-coupled semiconductor sensor reacts to light of less intensity, to which the linear analog sensor no longer responds because of its own high background noise level. The linear charge-coupled semiconductor sensor, however, has, compared to the linear analog sensor, the disadvantage of having, for approximately the same dimensions, an appreciably smaller resolution. This is because it is not possible for technical-construction reasons to accommodate more than a certain number of electrodes on a specified length of the sensor. This can only be counteracted if the dimensions of the linear charge-coupled semiconductor sensor are increased appreciably in comparison with those of the linear analog sensor, whereby more electrodes can be arranged in a series. This also has the result, however, that the distance (focus) relative to the optical image reproduction unit and relative to the object has to be chosen essentially larger, which involves the disadvantage that the apparatus becomes altogether considerably larger. In this connection it should be mentioned that up to now linear charge-coupled semiconductor sensors have been known with which approximately 4000 electrodes are arranged in one series.

OBJECT OF THE INVENTION

The invention has the object of constructing an apparatus of the type described at the beginning, the dimensions of which are not so large as are required for high resolution with charge-carrier-coupled semiconductor sensors known up to now, whereby, however, the advantage of the charge-carrier-coupled semiconductor sensors, namely the high sensitivity and the possibility of the distinction between the spurious and useful light should be retained.

SUMMARY OF THE INVENTION

The object is achieved according to the invention in that the charge-coupled semiconductor sensor has several parallel electrode series in a way known per se, in such a way that the electrodes and with that the charge carrier packets settling in their vicinity form a matrix-grid, and that determining the position of the light spot-point of concentration in the measurement direction defined by the electrode series is improved in that the pulses of the pulse trains retrieved from all electrode series are evaluated.

The basis of the invention therefore is the essential concept of using an areal charge-coupled semiconductor sensor, known per se, instead of a linear charge-coupled semiconductor sensor with a plurality of electrodes arranged in a series. This areal charge-coupled semiconductor can have in one series a reduced number of electrodes compared with the linear charge-carrier-coupled semiconductor sensor. The resulting disadvantage of small resolution is counteracted by the evaluation of the pulse trains of several series. This leads to an improvement when determining the position of the light spot-point of concentration and with this to an improvement in resolution. One works on the basis that the light spot falling on the two dimensional charge-coupled semiconductor sensor has only in the rarest cases such a small diameter that it encompasses only the semiconductor region above one electrode. In the majority of all cases the light spot will be so large that it illuminates a semiconductor region extending over a plurality of electrodes.

A two-dimensional charge-coupled semiconductor sensor is known for purposes of video and described in technical information 84 11 09 of the company VALVO, under the designation "semiconductor image pick-up NXA 1010 and NXA 1020".

Practical tests with a two-dimensional charge-coupled semiconductor sensor of the kind described last have led, when evaluating pulse trains corresponding to several illuminated electrode series, to a resolution improvement of about a factor of 20 compared to the evaluation of a pulse train relating to a single electrode series. With correspondingly large light spots resolution improvements are possible of about a factor of 1200, by evaluating a corresponding plurality of pulse trains, which correspond to all illuminated electrode series.

The calculation of the position of the light-spot-point of concentration on the semiconductor sensor in the measurement direction running parallel to the electrode series can take place according to the formula $$y_s = \frac{\Sigma 1/2 \cdot Sn \cdot Dn}{\Sigma Dn}$$

whereby $Sn = (y_{an} + y_{bn})$ and
$Dn = (y_{an} - y_{bn+1})$, and $y_{an}$ is the position on the semiconductor sensor 200 relating to the first pulse of that pulse train which corresponds to electrode series n, and whereby $y_{bn}$ is the position on the semiconductor sensor relating to the last pulse of the pulse train.

A further suggestion for increasing the accuracy of the calculation of the position of the light spot-point of concentration on the semiconductor sensor consists in that the pulses produced by the semiconductor sensor, which have each, according to light intensity, a different pulse height, are converted into binary coded data in an analog digital converter and with useful light present are led to a first store and with useful light switched off are led to a second store, that the data stored in the two stores are subtracted from one another in a subtractor to eliminate spurious light influences, and that the subtracted data is then evaluated in a position computer.

A further possibility for increasing the accuracy of the calculation of the position of the light spot-point of concentration on the semiconductor sensor can consist in that the pulses produced from the semiconductor sensor which have each, according to the light spot intensity, a different pulse height, are converted into binary coded data in an analog digital converter, stored in a first store and multiplied in a multiplier, for the purpose of correlation, with data of a specified light spot of a determined form stored in a second store, and that the multiplied data are evaluated in a position computer.

As already mentioned, the known apparatuses already contain an illumination unit for illuminating the object, the distance of which should be measured, whereby the light reflected from the object by the image reproduction system is imaged as light spot on the semiconductor sensor. It is now proposed for improving the measuring accuracy that the illumination unit contains a laser or a light-emitting diode.

In order to be able to use the apparatus for determining the surface topography of the object, it is furthermore proposed to make the illumination unit such that it can swing, in such a way that the light ray scans the surface of the object at a changing angle and that there is provision for an angle measuring unit for the light ray, the measurement value from which is evaluated in an evaluation circuit together with the measurement value established with the semiconductor sensor.

An alternative to that can consist in that the illumination unit is mobile above the surface of the object, in such a way that light ray falls in a vertical manner on the surface and the evaluation circuit is designed for a two-dimensional evaluation.

BRIEF DESCRIPTION OF THE DRAWINGS

FIG. 3 shows a known apparatus with a linear charge-coupled semiconductor sensor, as described above;

FIGS. 4a and 4b show a cross-section and a top view of the known linear charge-coupled semiconductor used with the apparatus in FIG. 3, as already described;

FIG. 7 shows an example of the calculation of the position of the light spot-point of concentration with the two-dimensional charge-coupled semiconductor sensor according to FIG. 5;

DETAILED DESCRIPTION OF PREFERRED EMBODIMENTS OF THE INVENTION

Figure 1:
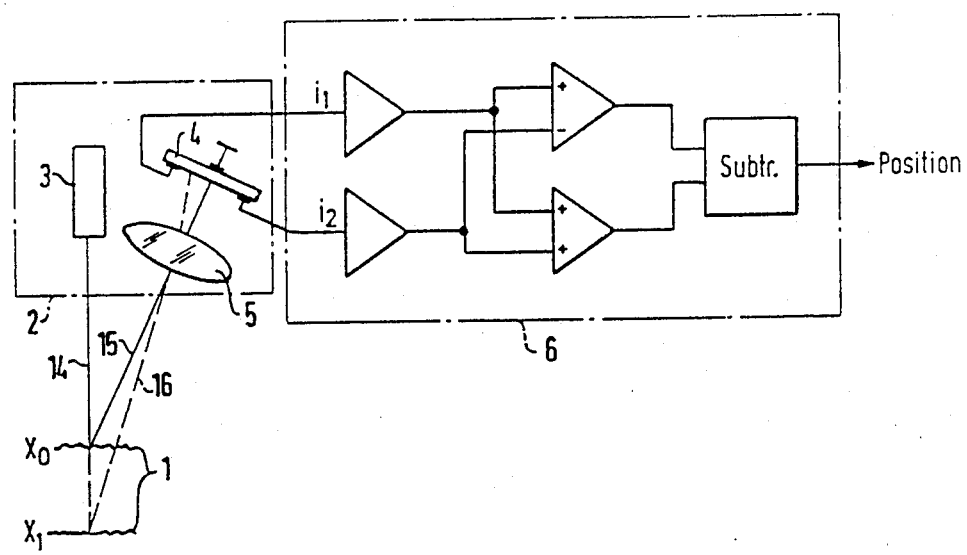
FIG. 1 shows a known apparatus for determining distance, with a linear analog sensor, as described at the beginning.
Figure 2:
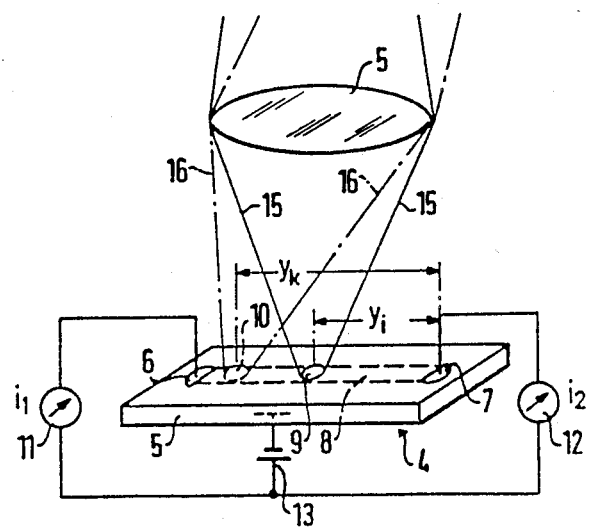
FIG. 2 shows the known linear analog sensor used with the apparatus in FIG. 1, as described above.
Figure 5:
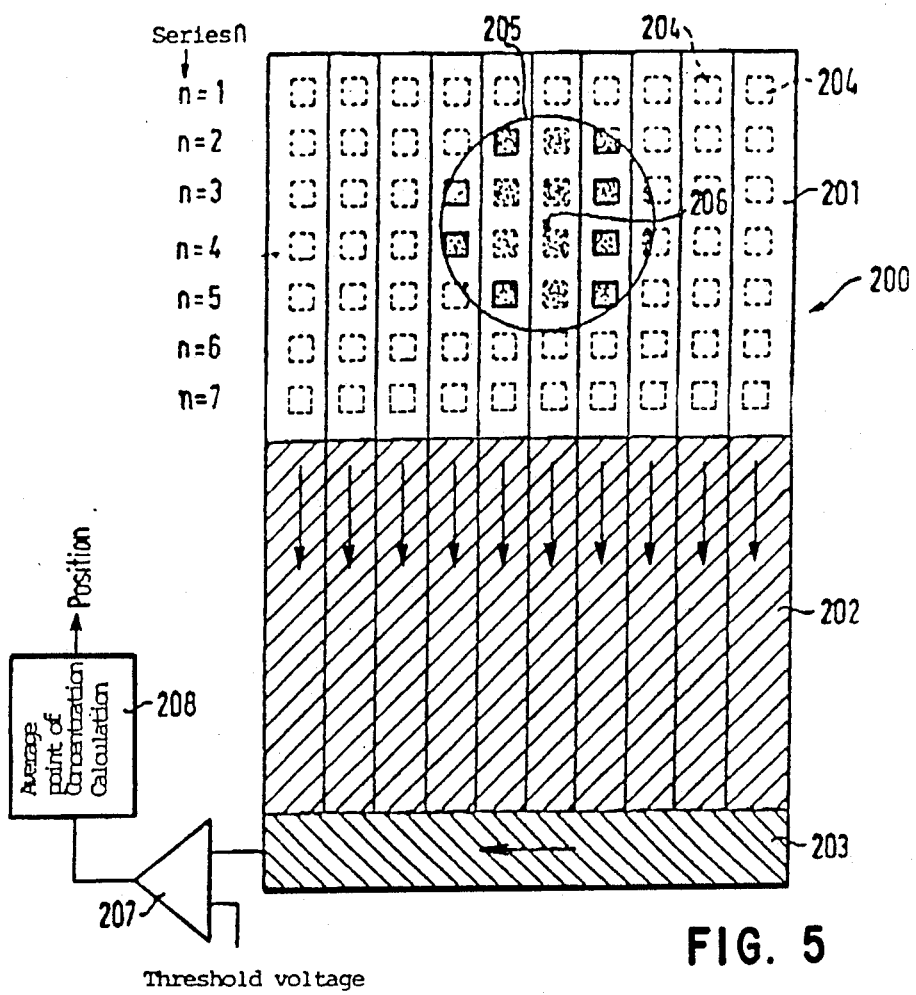
FIG. 5 shows a known per se two-dimensional charge-coupled semiconductor sensor, the application of which according to the invention is proposed here and is described below.

In FIG. 5 a two-dimensional charge-coupled semiconductor sensor is denoted by 200. This has an image region 201, a storage region 202 and a readout register 203. The electrodes arranged in rows and columns are denoted by 204. Seven rows are provided. The light spot is denoted by 205. The point of concentration (middle point) of the light spot 205 is denoted by 206. Charge-carrier packets assemble over the illuminated electrodes 204, which packets are indicated by a plurality of dots. The charge carrier packet lying first and last in each of the illuminated electrode rows are thickly bordered. As is described in more detail in the technical information 84 11 09 of VALVO, the charge carrier packets are shifted into the storage region by means of a certain control of the electrodes and then led one after the other to the threshold voltage discriminator 207 by the readout register 203. The threshold voltage discriminator 207 passes only those pulses which lie over a particular threshold voltage. Those are pulses which are derived from charge carrier packets which lie above electrodes 204 which are at least half-illuminated. The pulses emitted by threshold voltage discriminator 207 are then evaluated in a computer 208 to calculate the point of concentration of the light spot 205.

Figure 6:
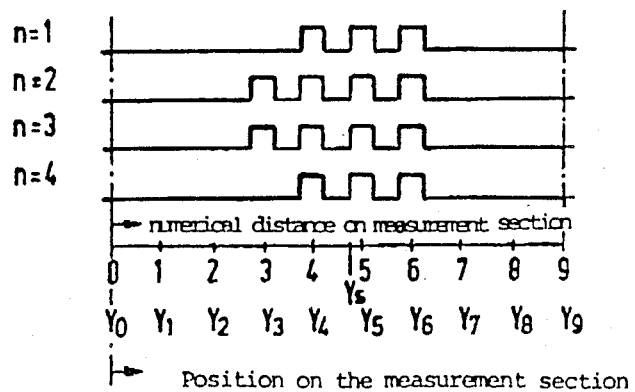
FIG. 6 shows four pulse trains provided by the two-dimensional charge-coupled semiconductor according to FIG. 5.

The pulse trains correponding to the many illuminated electrode rows or series are illustrated in FIG. 6. In the electrode series $n=1$ and $n=4$ pulses occur which correspond to the positions $y_4$ to $y_6$. In electrode series $n=2$ and $n=3$ pulses occur which correspond to positions $y_3$ to $y_6$. The numerical distances on the measurement range corresponding to these positions can be seen from FIG. 6. Each first and last pulse in each pulse train has been drawn thickly. From the calculation example in FIG. 7 the resulting point of concentration is a position, in the measuring direction, of $y_s=4.7$. This corresponds almost exactly to the position of the point of concentration 206 in FIG. 5. If only series $n=1$ or $n=4$ were evaluated, then a point of concentration of $y_s=5$ would be produced. This position varies from the actual position. If only the series $n=2$ or $n=3$ were evaluated, then a point of concentration position of $y_s=4.5$ would result. This position also varies from the actual position. One can therefore recognise that by evaluating all four illuminated electrode series a significant increase in the accuracy when calculating the position of the light spot-point of concentration is achieved and with that also a corresponding increased accuracy when calculating the distance to be established.

Figure 8:
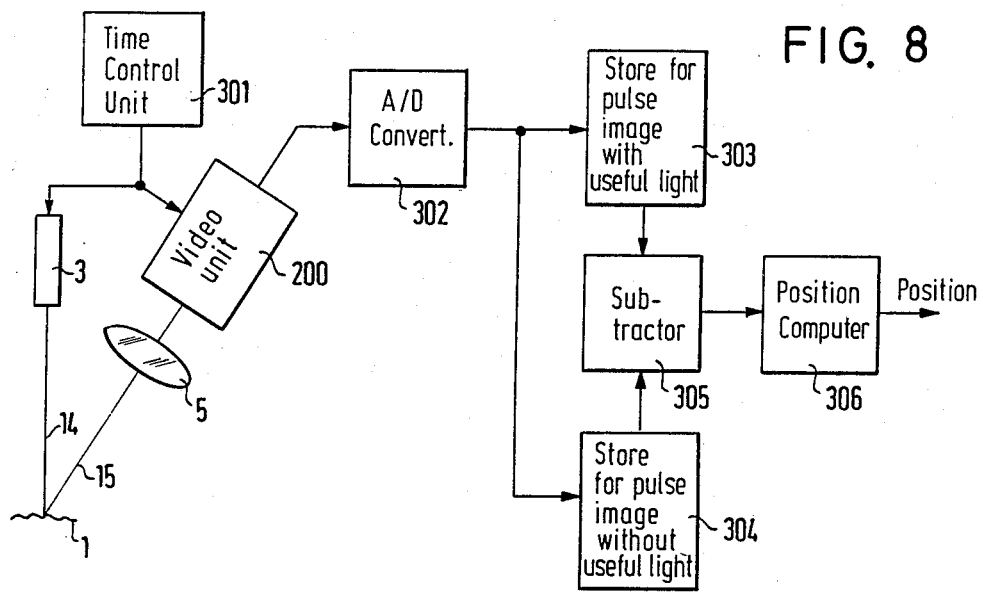
FIG. 8 shows a block diagram for an improved evaluation circuit for increasing the accuracy of the calculation of the position of the light spot-point of concentration.

In the block diagram in FIG. 8 an analog digital converter 302 is connected to the video unit 200, which corresponds to the unit shown in FIG. 5, which converter converts pulses of differing pulse heights (determined by more or less strongly illuminated electrode regions) into binary data. These binary data are led to a store 303 when the illumination unit 3 is switched on and then when the ilumination unit is switched off to a store 304. Switching on and off of the illumination unit 3 can take place alternately one after another at intervals and can be controlled by a time control unit 301. The data stored in the two stores 303 and 304 is then led to a subtractor 305. In this way effects of spurious light are eliminated. The data thus cleared of spurious light influences in this way is led to a position computer 306 which then calculates the position of the light spot.

Figure 9:
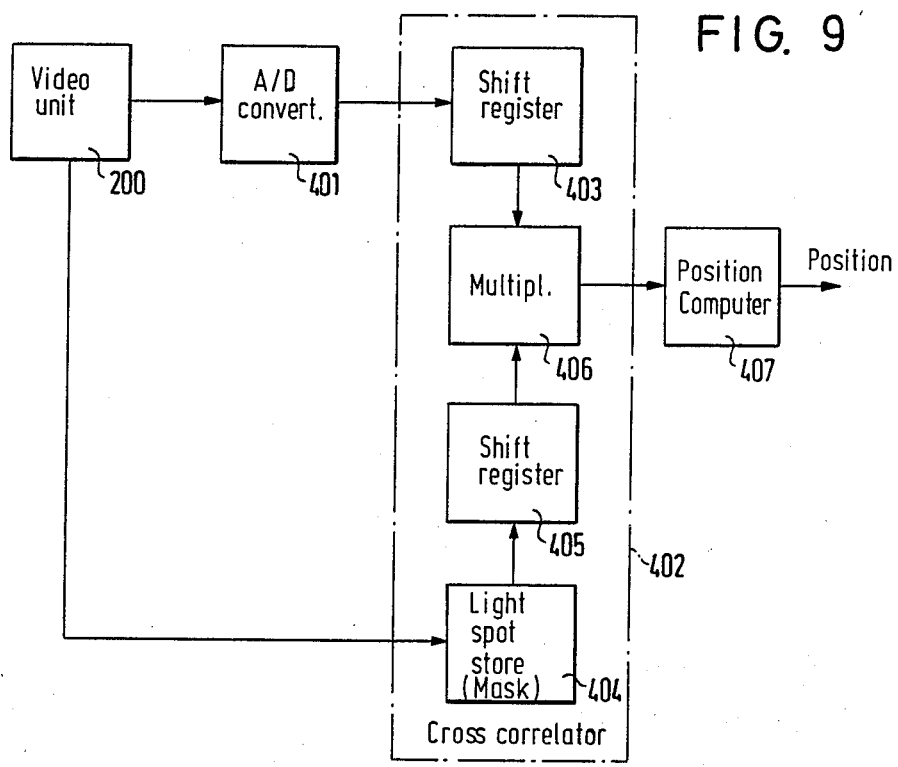
FIG. 9 shows a block diagram of another improved evaluation circuit for increasing the accuracy of the calculation of the position of the light spot-point of concentration.

In FIG. 9 a circuit is shown with which, again, a video unit 200 according to FIG. 5 is used. Also, here, the pulses of different pulse heights emitted by the video unit 200 are led to an analog digital converter 401, which transforms them into binary data. This is led to a shift register 403. In a light spot-store 404 data for a light spot of a specified form is stored. This is retrieved by the video unit 200 and then led to a shift register 405. A multiplier 406 multiplies the data emitted by the shift registers 403 and 405. The blocks 403 to 406 practically form a cross correlator 402. The application of the cross correlation principle leads to an increase in the resolution. This is because with temporal coincidence of the data which corresponds to the specified stored light spot and the data emitted by the video unit 200 a considerable intensification is provided in the multiplier 406, as if one were to travel with a shadow mask corresponding to the specified light spot over the picture region of the video unit 200. If the light spot falls through a shadow mask, then a strong output signal is given automatically. The output product of the multiplier 406 is led to a position computer 407 which then calculates the position with increased accuracy.

What is claimed is:

1. An apparatus for determining the real or virtual distance of a light source from a measurement plane using an optical image reproduction system which images light emanating from a light source as a light spot having a point of concentration on the measurement plane, said apparatus comprising:
   a charge-coupled semiconductor sensor, disposed in the measurement plane, and having several parallel series of electrodes arranged to form a matrix grid, each electrode series developing pulses forming a pulse train in response to the development of charge carrier packets in the vicinity of the electrodes; and
   circuit means for evaluating the pulses of the pulse trains retrievable from the charge-coupled semiconductor sensor such that the position of the light spot-point of concentration on the measurement plane and thus the distance to the light source is determined by evaluating the pulses of pulse trains retrievable from all electrode series.

2. The apparatus according to claim 1, wherein said circuit means includes means for performing the calculation of the position $y_s$ of the light spot-point of concentration on the semiconductor sensor, in the measuring direction running parallel to the electrode series, according to the formula:

$$y_s = \frac{\Sigma \, 1/2 \cdot S_n \cdot D_n}{\Sigma \, D_n}$$

whereby $$S_n = (y_{an} + y_{bn})$$

and $$D_n = (y_{an} - y_{bn} + 1),$$

whereby $y_{an}$ is the position on the semiconductor sensor which is to be assigned to the first pulse of that pulse train which corresponds to the nth electrode series, and whereby $y_{bn}$ is the position on the semiconductor sensor which is to be assigned to the last pulse of this pulse train.

3. The apparatus according to claim 1 or 2, wherein said circuit means includes:
   analog-to-digital converter means for converting the pulses produced by the semiconductor sensor, having, according to light intensity, differing pulse heights, into binary coded data;
   first means for storing said binary coded data when useful light is available;
   second means for storing said binary coded data when useful light is not available;
   means for subtracting the data stored in the two storing means from one another to eliminate effects of ambient light; and
   position computer means for evaluating the subtracted data.

4. The apparatus according to claim 1 or 2, wherein said circuit means includes:
   analog-to-digital converter means for converting the pulses produced by the semiconductor sensor, having, according to light intensity, differing pulse heights, into binary coded data;
   first means for storing said binary coded data;
   second means for storing data of a specified light spot of a certain form;
   means for multiplying, for the purpose of cross correlation, the data stored in said first storing means with the data stored in said second storing means; and
   position computer means for evaluating said multiplied data.

5. The apparatus according to claim 1, further including an illumination unit for lighting an object the distance of which should be measured, whereby the light reflected from the object is imaged by the image reproduction system as a light spot on the semiconductor sensor, said illumination unit containing a laser or a light-emitting diode.

6. The apparatus according to claim 5, wherein, to determine the surface topography of the object, the illumination unit is able to swing in such a way that the light ray scans the surface of the object at a changing angle, and that there is provision for an angle measuring unit for the light ray, and wherein the angle measurement value from the angle measuring unit and the measuring value established by the semiconductor sensor are evaluated by said circuit means.

7. The apparatus according to claim 5, wherein, to determine the surface topography of the object, the illumination unit is able to swing in such a way that the light ray scans the surface of the object at a changing angle in two coordinates line by line, and wherein angle information and the measuring value established by the semiconductor sensor are evaluated by said circuit means.

8. The apparatus according to claim 5, wherein, to determine the surface topography of the object, the illumination unit is mobile above the surface of the object, in such a way that the light ray constantly falls vertically on the surface, and wherein the circuit means is designed for a two-dimensional evaluation.

* * * * *